(12) United States Patent
Damm-Goossens

(10) Patent No.: US 8,739,260 B1
(45) Date of Patent: May 27, 2014

(54) SYSTEMS AND METHODS FOR AUTHENTICATION VIA MOBILE COMMUNICATION DEVICE

(75) Inventor: Andre Damm-Goossens, Las Vegas, NV (US)

(73) Assignee: SecSign Technologies Inc., Henderson, NV (US)

( * ) Notice: Subject to any disclaimer, the term of this patent is extended or adjusted under 35 U.S.C. 154(b) by 364 days.

(21) Appl. No.: 13/371,357

(22) Filed: Feb. 10, 2012

Related U.S. Application Data

(60) Provisional application No. 61/441,604, filed on Feb. 10, 2011, provisional application No. 61/467,895, filed on Mar. 25, 2011.

(51) Int. Cl.
 H04L 29/06 (2006.01)
 H04L 9/32 (2006.01)
(52) U.S. Cl.
 CPC .......... H04L 63/0853 (2013.01); H04L 9/3234 (2013.01)
 USPC ...................................... 726/7; 726/4; 726/5
(58) Field of Classification Search
 CPC .......................... H04L 63/0853; H04L 9/3234
 USPC ..................................................... 726/4, 5, 7
 See application file for complete search history.

(56) References Cited

U.S. PATENT DOCUMENTS

| | | | |
|---|---|---|---|
| 5,201,000 A | 4/1993 | Matyas et al. | |
| 6,181,795 B1 | 1/2001 | Chandersekaran et al. | |
| 6,335,972 B1 | 1/2002 | Chandersekaran et al. | |
| 6,718,468 B1 | 4/2004 | Challener et al. | |
| 6,931,526 B1 | 8/2005 | Bacha et al. | |
| 6,950,523 B1 | 9/2005 | Brickell et al. | |
| 6,970,562 B2 | 11/2005 | Sandhu et al. | |
| 7,562,221 B2 | 7/2009 | Nystrom et al. | |
| 7,660,421 B2 | 2/2010 | Hopkins et al. | |
| 7,778,934 B2 | 8/2010 | Graves et al. | |
| 7,949,880 B2 | 5/2011 | Champine et al. | |
| 8,225,095 B2 | 7/2012 | Funk | |
| 8,284,942 B2 | 10/2012 | Cantwell et al. | |
| 2002/0067832 A1 | 6/2002 | Jablon | |
| 2004/0068650 A1 | 4/2004 | Resnitzky et al. | |

(Continued)

OTHER PUBLICATIONS

United States Patent and Trademark Office (USPTO), Office Action Mailed Jun. 24, 2013 for U.S. Appl. No. 13/430,534, filed Mar. 26, 2012.

(Continued)

*Primary Examiner* — Chau Le
(74) *Attorney, Agent, or Firm* — Law Office of Andrei D Popovici, PC

(57) ABSTRACT

Described systems and methods allow secure and relatively convenient authentication of a secure login session. When a user initiates a login session on a secure site using a client computer system (e.g. laptop, tablet, smartphone), matching login session identifiers (Ticket IDs) are displayed on the client computer system and a mobile communication device uniquely associated with the user (e.g. the user's smartphone). Upon verifying that the two Ticket IDs match, the user accepts the Ticket ID displayed on the mobile communication device, which causes the login session by the client computer system to proceed. Identity verification proceeds largely in the background, through communications between an authentication server, service provider server, and mobile communication device, and involves minimal user input. Techniques are disclosed for reducing the incidence of inadvertent acceptance of incorrect Ticket IDs by users, and reducing system vulnerability to attacks.

30 Claims, 11 Drawing Sheets

(56) References Cited

U.S. PATENT DOCUMENTS

| | | | |
|---|---|---|---|
| 2004/0139028 A1 | 7/2004 | Fishman et al. | |
| 2005/0268107 A1* | 12/2005 | Harris et al. | 713/182 |
| 2006/0182283 A1 | 8/2006 | Sandhu et al. | |
| 2008/0120504 A1 | 5/2008 | Kirkup et al. | |
| 2009/0029677 A1 | 1/2009 | Choi et al. | |
| 2009/0119759 A1* | 5/2009 | Taugbol | 726/6 |
| 2009/0235346 A1* | 9/2009 | Steinberg | 726/8 |
| 2009/0282247 A1 | 11/2009 | Kirkup et al. | |
| 2009/0287921 A1* | 11/2009 | Zhu et al. | 713/155 |
| 2010/0005519 A1* | 1/2010 | Lim | 726/6 |
| 2010/0218241 A1* | 8/2010 | Faryna | 726/5 |
| 2010/0332832 A1* | 12/2010 | Wu et al. | 713/169 |
| 2011/0185181 A1* | 7/2011 | Lin | 713/176 |
| 2013/0024695 A1 | 1/2013 | Kandrasheu et al. | |

OTHER PUBLICATIONS

Damm-Goossens, U.S. Appl. No. 13/430,534, filed Mar. 26, 2012.

Verisign, "Identity Protection Mobile Center," p. 1, Symantec Corp., Mountain View, CA, downloaded from vipmobile.verisign.com on Dec. 7, 2010.

Arcot, "Arcot ID," p. 1, CA Technologies, Islandia, NY, downloaded from arcot.com on Jan. 4, 2011.

Valimo, "Valimo Mobile ID Overview," p. 1, Valimo Wireless, Vantaa, Finland, downloaded from valimo.com on Dec. 7, 2010.

Safenet, "SMS Authentication," p. 1-5, SafeNet, Inc., Belcamp, MD, downloaded from safenet-inc.com on Jan. 4, 2011.

Tsirulnik, G., "RSA Launches Mobile Authentication Service," p. 1-2, Mobile Marketer, New York, NY, May 30, 2008.

Kobil, "SecOVID Soft Token," p. 1, Kobil Systems GmbH, Worms, Germany, downloaded from kobil.com on Jan. 4, 2011.

ENCAP, "How Does it Work? How is it Different?" p. 1-4, Encap AS, Fornebu, Norway, downloaded from encap.no. on Dec. 7, 2010.

United States Patent and Trademark Office (USPTO), Notice of Allowance Mailed Mar. 14, 2014 for U.S. Appl. No. 13/430,534, filed Mar. 26, 2012.

* cited by examiner

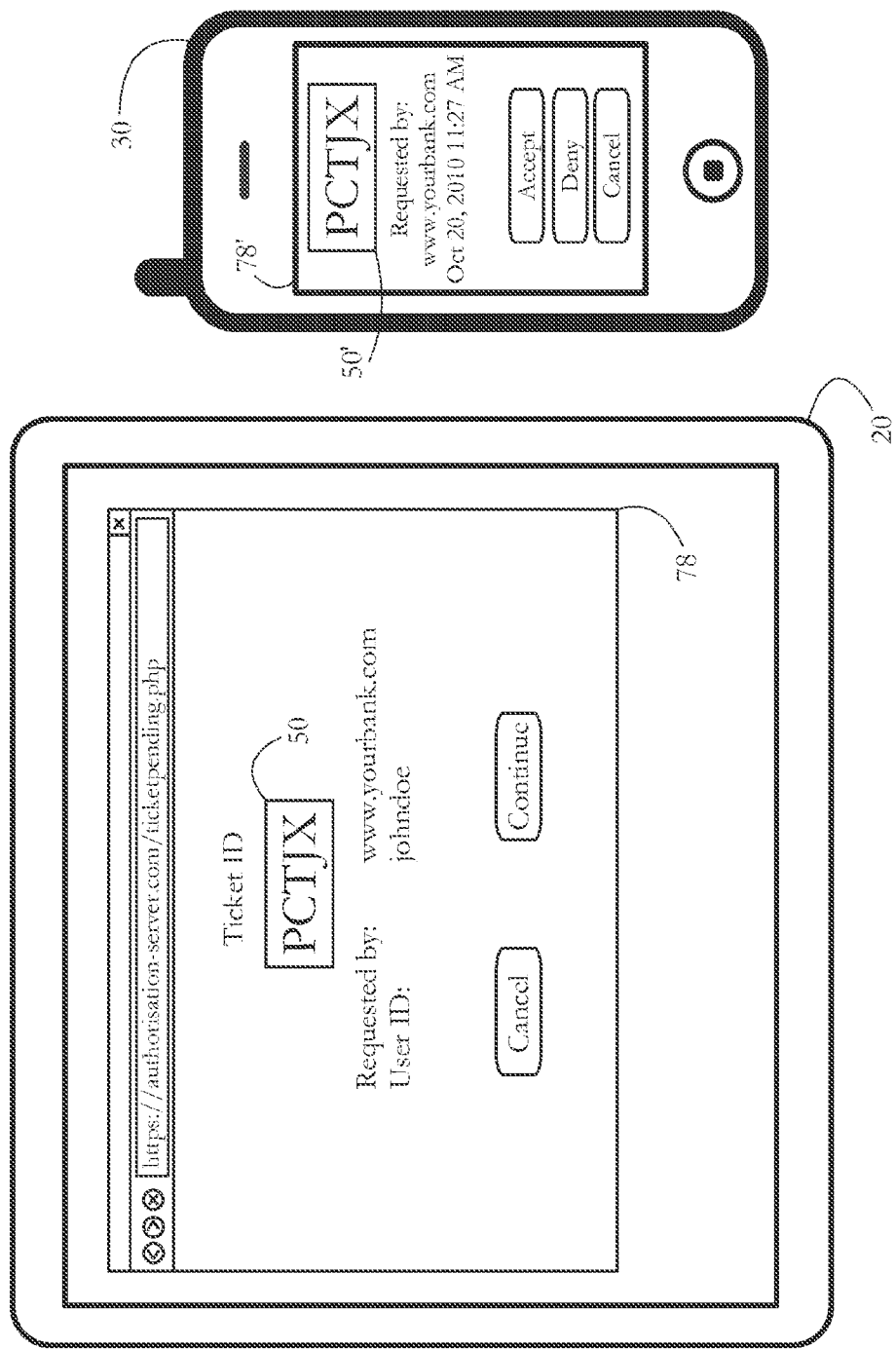
FIG. 8-A

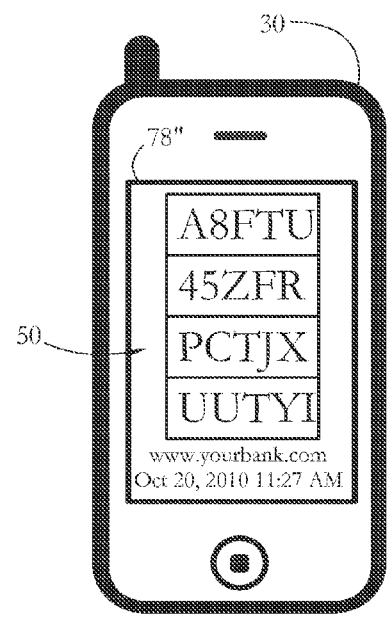
FIG. 8-B
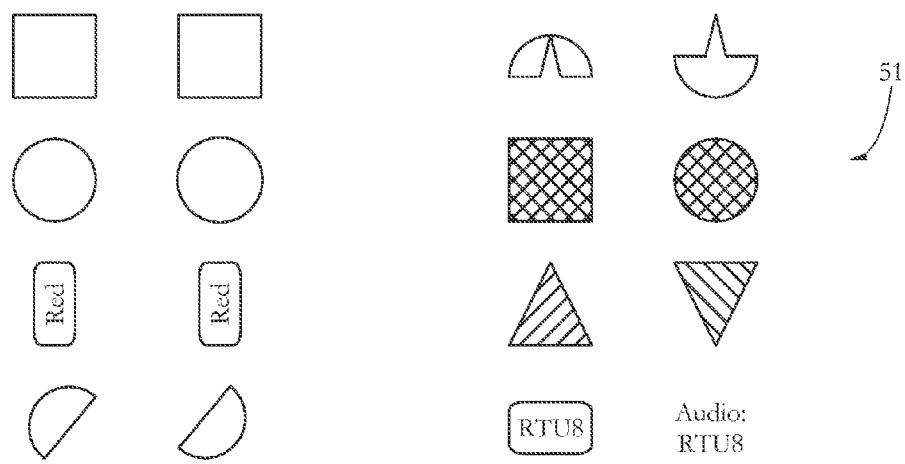
FIG. 8-C

SYSTEMS AND METHODS FOR AUTHENTICATION VIA MOBILE COMMUNICATION DEVICE

RELATED APPLICATION DATA

This application claims the benefit of the filing date(s) of U.S. Provisional Patent Applications No. 61/441,604, filed Feb. 10, 2011, and 61/467,895, filed Mar. 25, 2011, which are herein incorporated by reference.

BACKGROUND

The invention relates to systems and methods for authenticating users of computer systems, and in particular to systems and methods for authenticating users of computer systems using mobile communications devices.

Two-factor authentication has been proposed as an approach to increasing authentication security relative to the basic username/password method. In an example of such an approach, when a user enters a correct username and associated password to log into a secure site, a one-time code is transmitted to the user's telephone via a voice message or SMS, or to the user's email address, and the user must enter the one-time code on the secure site to complete the login process. A one-time code may also be provided by a hardware display token designed as a keyfob or similar special-purpose portable device, such as the SecurID token sold by RSA, the security division of EMC corporation.

The design of user authentication systems is commonly affected by tradeoffs between security and usability. Increasing system security often involves imposing additional burdens on users, which may reduce system usability.

SUMMARY

According to one aspect, an authentication server computer system comprises at least one processor configured to: communicate with a mobile communication device of a user to authenticate the mobile communication device as authorized to validate a user login session by a user client computer system on a service provider server; send to the mobile communication device a request for user validation of the user login session on the service provider server; in response to sending to the mobile communication device the request for user validation of the user login session, receive from the mobile communication device a user acceptance of the request for user validation of the user login session, wherein the user acceptance indicates a user confirmation that a first sensory identification of the login session presented to the user on the user client computer system matches a second sensory identification of the login session presented to the user on the mobile communication device; and in response to authenticating the mobile communication device and receiving the user acceptance, send to the service provider an indicator of the user's acceptance, for allowing the user client computer system access to a restricted resource on the service provider server.

According to another aspect, a mobile communication device comprises at least one processor configured to: communicate with an authentication server computer system to authenticate the mobile communication device as authorized to validate a user login session by a user client computer system on a service provider server; receive from the authentication server computer system a request for user validation of the user login session on the service provider server; in response to receiving the request for user validation of the user login session, present to the user a first sensory identification of the login session, wherein the first sensory identification matches a second sensory identification of the login session presented to the user on the user client computer system; receive from the user a user acceptance of the request for user validation of the user login session, wherein the user acceptance indicates a user confirmation that the first sensory identification matches the second sensory identification; and in response to receiving the user acceptance, send to the authentication server computer system an indicator of the user acceptance, for allowing the user client computer system access to a restricted resource on the service provider server.

According to another aspect, a service provider computer system comprises at least one processor configured to: receive from a user client computer system a request to initiate a user login session for a user; generate and send to the user client computer system a first sensory identification of the login session to be presented to the user by the user client computer system; send to an authentication server computer system a request for user validation of the user login session; receive from the authentication server computer system an indicator of the user's acceptance of the request for user validation, wherein receiving the indicator of the user's acceptance indicates: an authentication by the authentication server computer system of a mobile communication device of the user as authorized to validate the user login session, and a user confirmation that a second sensory identification of the login session presented to the user on the mobile communication device matches the first sensory identification of the login session presented to the user by the user client computer system; and in response to receiving from the authentication server computer system the indicator of the user's acceptance of the request for user validation, allowing the user client computer system access to a restricted resource on the service provider server.

BRIEF DESCRIPTION OF THE DRAWINGS

The foregoing aspects and advantages of the present invention will become better understood upon reading the following detailed description and upon reference to the drawings where:

FIG. 8-A shows an exemplary display of matching Ticket IDs on a client computer system and a mobile communication device according to some embodiments of the present invention.

FIG. 8-B shows other examples of matching pairs of Ticket ID displays according to some embodiments of the present invention.

DETAILED DESCRIPTION OF PREFERRED EMBODIMENTS

Figure 1:
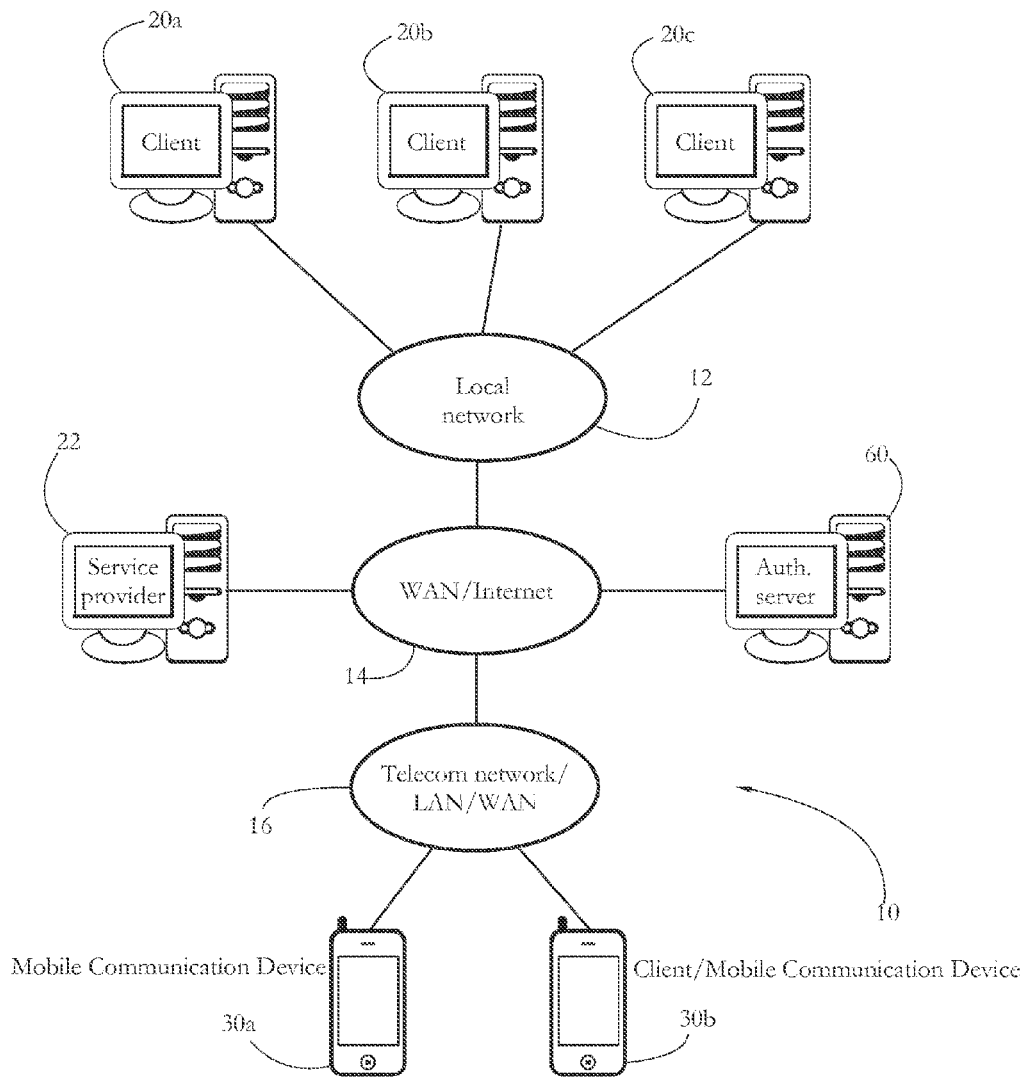
FIG. 1 shows an identity authentication system according to some embodiments of the present invention.

Systems and methods described herein may include or employ one or more interconnected computer systems and/or mobile communication devices comprising one or more processors and associated memory, storage, input and display devices. Such computer systems and/or mobile communication devices may run software implementing methods described herein when executed on hardware. According to some embodiments, mobile communication devices include mobile telephones such as smartphones. In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A wide area network is a network, such as the Internet, that includes at least one router. Computer programs described in some embodiments of the present invention may be stand-alone software entities or sub-entities (e.g., subroutines, code objects) of other computer programs. Computer readable media encompass storage (non-transitory) media such as magnetic, optic, and semiconductor media (e.g. hard drives, optical disks, flash memory, DRAM), as well as communications links such as conductive cables and fiber optic links. According to some embodiments, the present invention provides, inter alia, computer systems and/or mobile communication devices programmed to perform the methods described herein, as well as computer-readable media encoding instructions to perform the methods described herein. It will be clear to one skilled in the art that the embodiments described herein may be altered in many ways without departing from the scope of the invention.

Some embodiments of the present invention provide a secure way to authenticate a user via a mobile communication device. Such authentication is useful e.g. for accessing web resources such as e-banking, electronic payment, and content subscription services, among others. In some embodiments, user authentication proceeds via a secure communication between an application running on a mobile communication device such as a mobile telephone and an identity authentication server. The server identifies itself against the mobile communication device via a certificate, while the mobile device proves its identity via a challenge-response exchange. In some embodiments, the challenge-response exchange requires a pair of cryptographic keys (one public, one private), as described below (see "Registration").

FIG. 1 shows an identity authentication system 10 according to some embodiments of the present invention. Authentication system 10 comprises a set of client computer systems 20a-c, a service provider computer system 22, an authentication server computer system 60, and a set of mobile communication devices 30a-b, all connected to a wide area network (WAN) 14 such as the Internet. A local area network 12 and a telecom/LAN/WAN network 16 may also connect some components of authentication system 10 to WAN 14. In some embodiments, any two or more of the illustrated service provider system 22, authentication server system 60, and client computer systems 20a-c may be implemented on common hardware, e.g. a common physical computer server. For example, in an automatic teller machine (ATM) system, the ATM machine may include a service provider, client, and authentication server on a common physical computer system, and connected to each other through the memory or other local structures of the physical computer system. In some embodiments, each of the systems shown in FIG. 1 is implemented on a distinct physical computer system, and is connected to other systems through LAN/WAN/telecom network connections.

Figure 2:
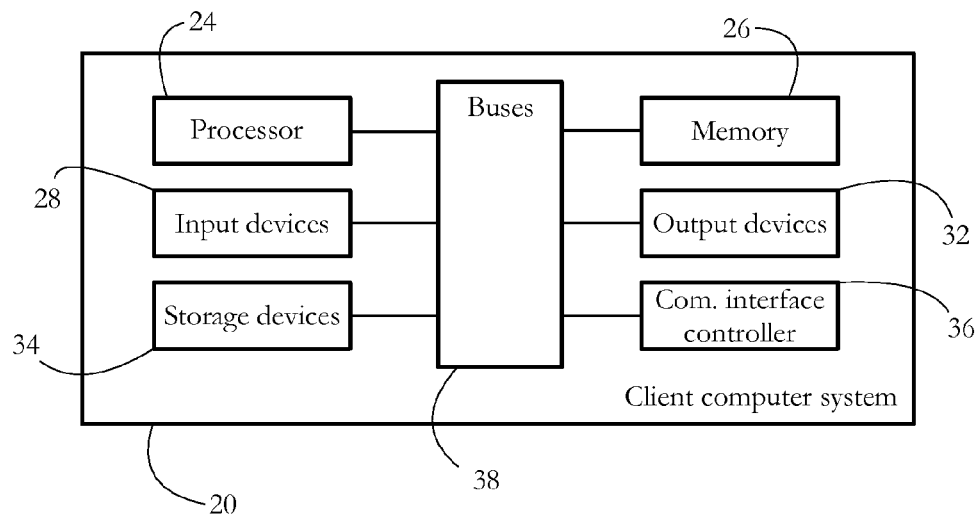
FIG. 2 illustrates exemplary hardware components for a client computer system according to some embodiments of the present invention.

A client computer system 20 comprises a plurality of hardware components, schematically illustrated in FIG. 2. In particular, one or more buses 38 connect a microprocessor (CPU) 24, memory (e.g. DRAM) 26, input devices (e.g. mouse, keyboard) 28, output devices (e.g. display, speakers, haptic/vibration generator) 32, storage devices (e.g. hard drive, solid state drive) 34, and a communication interface controller (e.g. network interface card) 36. The illustrated computer system 20 may be a personal computer, automatic teller machine (ATM), or mobile communication device usable to establish authenticated access to restricted resources. Such devices may be devices capable of web browsing and thus access to remotely-hosted protected websites, such as desktop, laptop, tablet computer devices, or mobile phones such as smartphones. In some embodiments, such devices may also be gateways to local resources, such as automatic teller machines (ATM), physical premise (e.g. building) security devices, or other local-authentication devices. If implemented on separate physical devices from client computer system 20, each of service provider computer system 22 and authentication server computer system 60 includes hardware components similar to the ones shown in FIG. 2.

Figure 3:
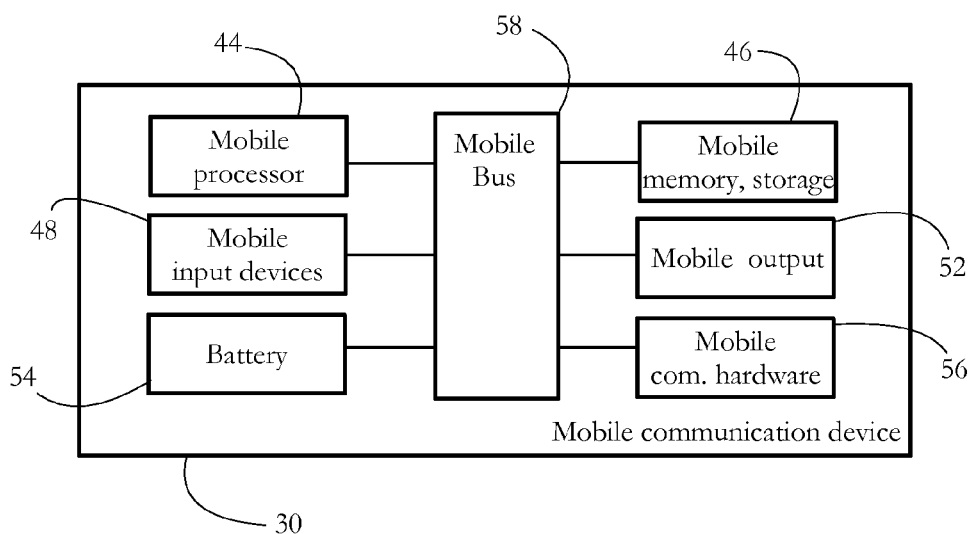
FIG. 3 shows exemplary hardware components for a mobile communication device according to some embodiments of the present invention.

A mobile communication device 30 includes a plurality of hardware components, schematically illustrated in FIG. 3. In particular, one or more buses 58 connect a mobile processor (CPU) 44, mobile memory and storage (e.g. DRAM, solid state drive) 46, mobile input devices (e.g. physical or touch-sensitive keyboard) 48, mobile output devices (e.g. display, speakers, haptic/vibration generator) 52, a battery 54, and mobile communication hardware (e.g. network interface card) 56. The illustrated mobile communication devices are portable devices with an autonomous power source (e.g. battery), such as mobile phones (e.g. smartphones), which are ordinarily carried by and uniquely associated with a user, and which are capable of performing the client-side authentication and/or display steps described below. Each mobile communication device may run an application (App) computer program configured to perform identity authentication, as shown below. In some embodiments, the same mobile communication device (e.g. a smartphone running a browser) may be used to perform the steps described below for mobile communication devices and client devices.

Authentication

Figure 4:
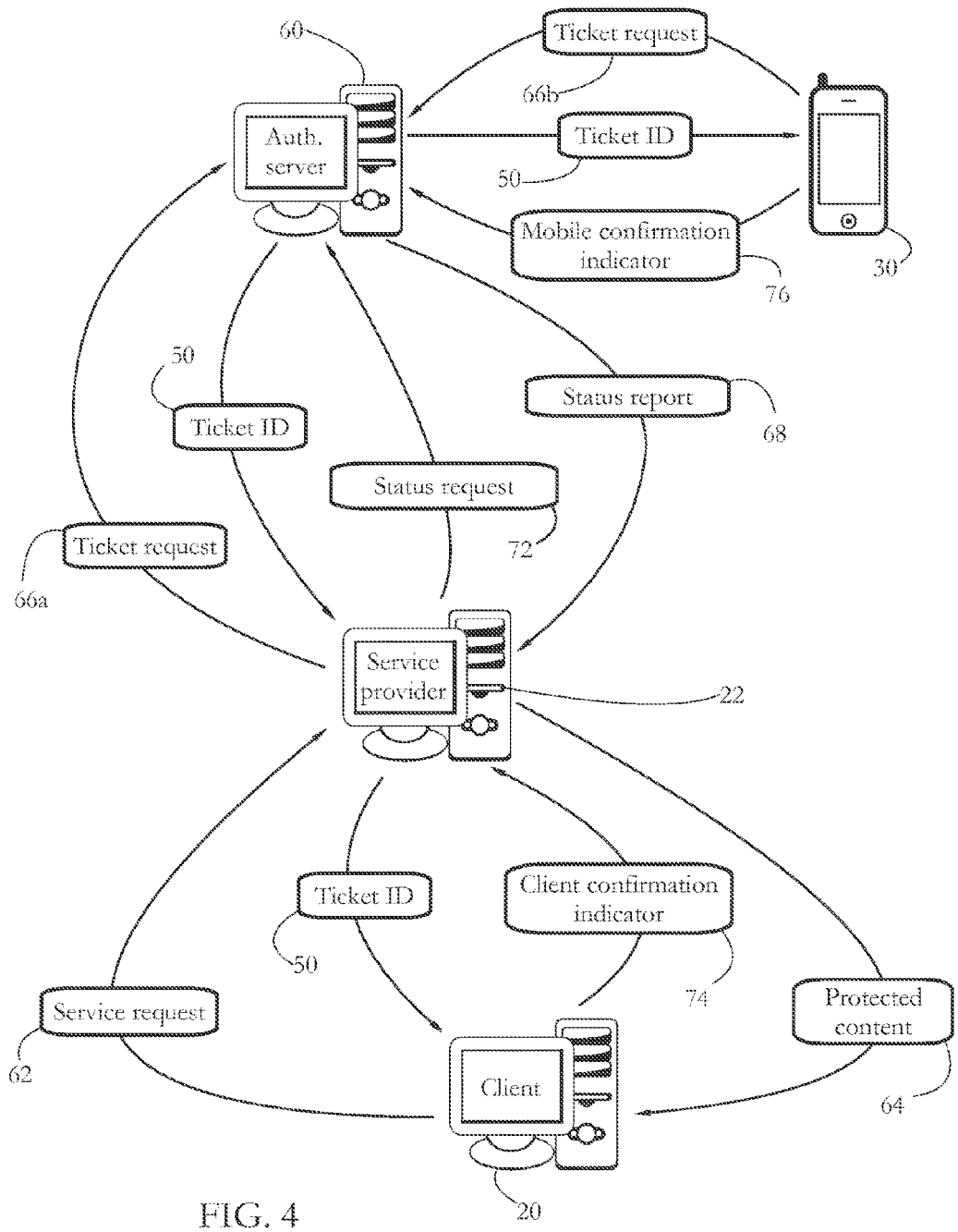
FIG. 4 illustrates a sequence of data exchanges between a client computer system, a service provider server, an authentication server, and a mobile communication device according to some embodiments of the present invention.

FIG. 4 illustrates a sequence of data exchanges between a client computer system 20, a service provider server 22, an authentication server 60, and a mobile communication device 30 to perform a user authentication according to some embodiments of the present invention. When a user requests access to a protected resource from a service provider (e.g. via a web portal), the service provider computer system launches a sequence of data exchanges with the client computer system and authentication server computer system. In some embodiments, all illustrated data exchanges are performed over secure connections. As described above, in some embodiments the client computer system may be the mobile communication device itself.

When a user desires to log into a protected resource (e.g. website) on service provider server 22, client computer system 20 sends to service provider server 22 a service (login) request 62 including an identifier of the user's account (e.g. the user's username). In response, service provider server 22 sends a ticket request 66a including an identifier of the user's account to authentication server 60. In some embodiments, mobile communication device 30 may also send a Ticket ID request 66b to authentication server 60. In response to one or both of requests 66a-b, authentication server 60 generates an authentication session identifier (Ticket ID) 50, and sends Ticket ID 50 to service provider server 22 and mobile communication device 30. Client computer system 20 and mobile communication device 30 present matching Ticket ID sensory representations (e.g. displays) to the user. The Ticket ID sensory representation presented by client computer system 20 may be generated by service provider server 22. In response to the presentation of a Ticket ID representation on mobile communication device 30, and confirmation by the user that the Ticket ID representations on mobile communication device 30 and client computer system 20 match, the user accepts or rejects the authentication session by entering appropriate input on communication device 30. In response, mobile communication device 30 sends a mobile confirmation indicator 76 to authentication server 60, indicating whether the authentication session has been accepted or rejected by the user. In some embodiments, client computer system 20 also sends a client confirmation indicator 74 to service provider 22. Service provider server 22 sends an authentication session (Ticket ID) status request 72 to authentication server 60, and receive a ticket state 68 (e.g. accepted, denied) in response. If the ticket is accepted, a secure session is established between client computer system 20 and service provider server 22, and protected content 64 is transferred from service provider server 22 to client computer system 20.

While it may be preferred to have authentication server 60 generate the Ticket ID for the login session, and send that common identifier to both mobile communication device 30 and service provider computer system 22, in some embodiments the Ticket ID may be generated by the mobile communication device, the service provider computer system, or possibly by another computer system, and propagated to the other computer systems to allow the presentation of matching Ticket ID representations by mobile communication device 30 and client computer system 20.

Figure 5:
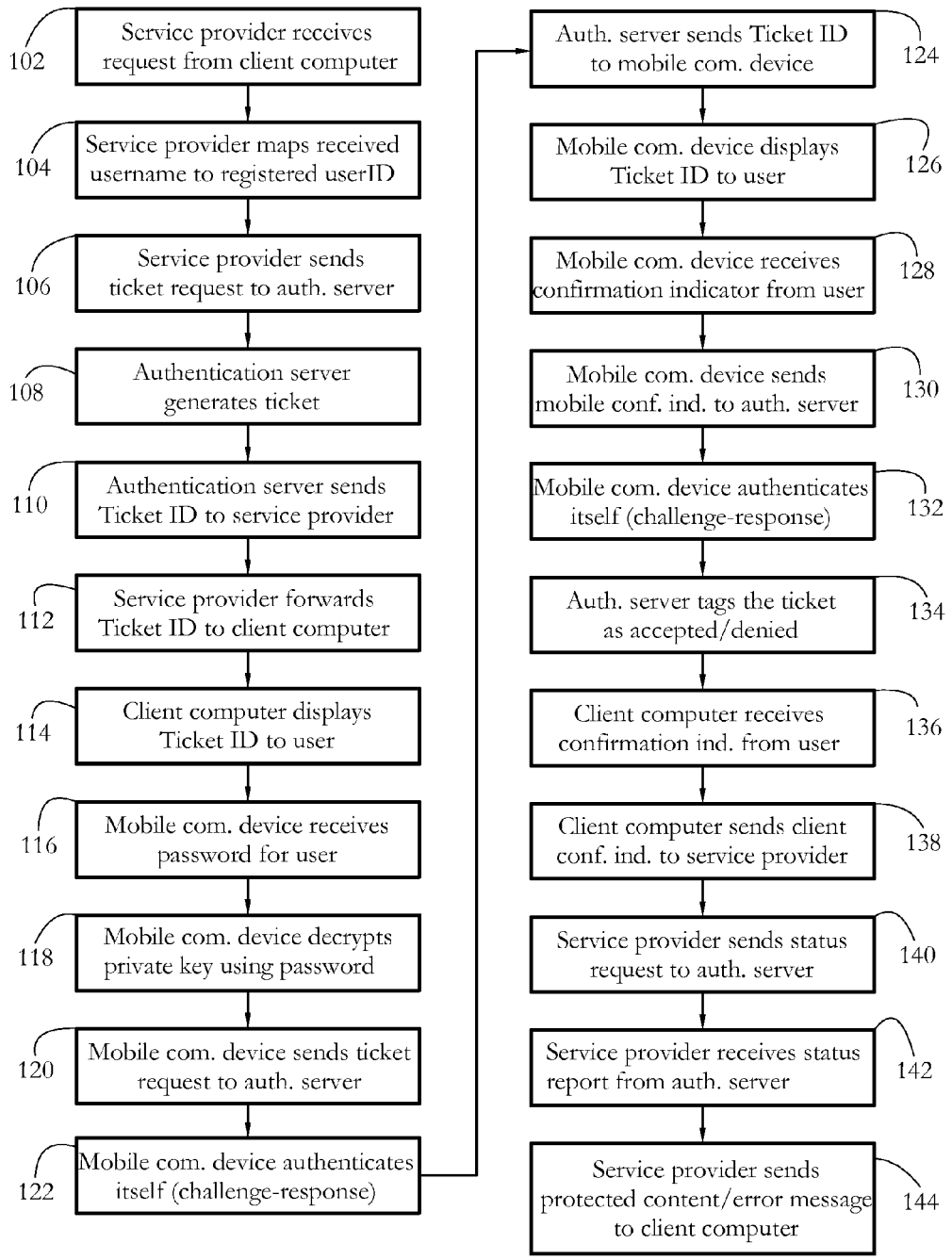
FIG. 5 shows a user authentication sequence of steps according to some embodiments of the present invention.

FIG. 5 shows a user authentication sequence of steps according to some embodiments of the present invention. It is understood that, as with features or steps illustrated in other Figures, one or more of the steps of FIG. 5 may be modified or omitted in some embodiments; for example, the mobile communication device need not necessarily authenticate itself multiple times to the authentication server as described in exemplary embodiments below. In a step 102, service provider server 22 receives a login (authentication) request including a username from client computer system 20 when the user enters his username to request access to the service provided by service provider server 22. In response, service provider server 22 maps the received username to an identifier of a registered identity/user (userID) (step 104), and requests authentication from authentication server 60 by sending to authentication server 60 an authentication ticket (Ticket ID) request including the mapped userID and a human-readable description of the service provided by service provider server 22 (e.g. BigBank Online Banking) (step 106). In response, authentication server 60 generates a Ticket ID suitable for identifying the login session. The generated Ticket ID includes an identifier of the login session, and may include or be associated with a timestamp of issue (e.g. date and/or time) for the Ticket ID. Authentication server 60 sends the Ticket ID and associated timestamp to service provider server 22 (step 110), which in turns forwards the Ticket ID and timestamp to client computer system 20 (step 112). In a step 114, client computer system 20 presents a sensory representation (e.g. display) of the Ticket ID to the user.

To complete the login process, the user accesses an authentication application running on mobile communication device 30. Mobile communication device 30 receives from the user a key-decryption password associated with the user's account/identity (step 116), and decrypts a locally-stored user private key using the received password (step 118). In a step 120, mobile communication device 30 requests any pending Ticket ID(s) for the user's identity from authentication server 60. In a step 122, mobile communication device 30 authenticates itself as the owner of the identity via challenge-response authentication using the decrypted private key, as described in more detail below in the section "Challenge-Response Exchange." In a step 124, authentication server 60 returns to mobile communication device the Ticket ID and associated timestamp and human-readable description of the service provided by service provider server 22.

In a step 126, mobile communication device 30 presents a sensory representation (e.g. display) of the Ticket ID and associated timestamp and human-readable service to the user. The sensory representation presented by mobile communication device 30 matches the sensory representation presented by client computer system 20 in step 114. Exemplary matching Ticket ID representations are shown in FIGS. 8-A-C. The user verifies that the two sensory representations match, and that the timestamp and service description make sense, and decides whether to accept or deny the access to the authentication ticket requested on mobile communication device 30. Mobile communication device 30 receives a confirmation/acceptance or denial indicator input by the user (step 128), sends to authentication server 60 a request to accept the Ticket ID (step 130), and authenticates itself to authentication server 60 as the owner of the identity via challenge-response authentication using the private key (step 132). In a step 134, authentication server 60 tags the authentication ticket as accepted or denied.

In a step 136, client computer system 20 receives a confirmation indicator from the user, indicating that the user wishes proceed with the login operation. In a step 138, client computer system 20 asks service provider server 22 to continue by sending a confirmation indicator to service provider server 22. In a step 140, service provider server 22 asks authentication server 60 for the ticket state by sending a ticket status request. Authentication server 60 returns the ticket status (accepted/denied) to service provider server 22 (step 142). In a step 144, service provider server 22 grants access to client computer system 20 if the ticket is accepted, or displays an error message if not.

Figure 6:
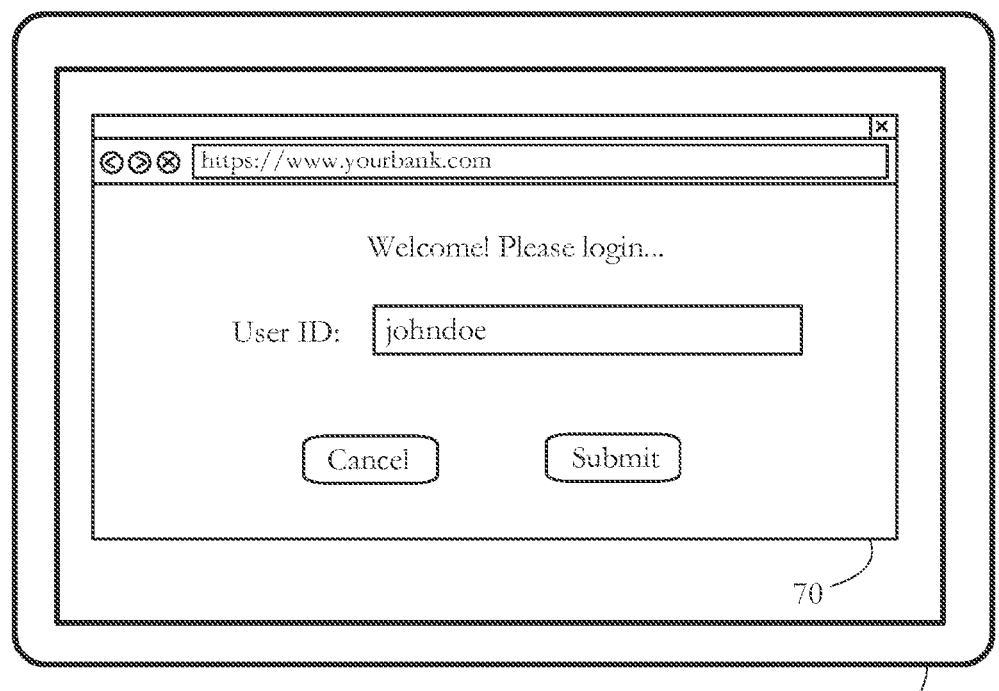
FIG. 6 shows a login screen generated by a service provider system and displayed on a client computer system, according to some embodiments of the present invention.

FIG. 6 shows an exemplary login screen 70 displayed on client computer system 20 for establishing an authenticated session with a web portal established by service provider server 22. Login screen 70 is a secure (e.g. Transport Layer Security/TLS or Secure Socket Layer/SSL) login screen of the web portal allowing a user to enter the unique name of his identity (username). Login screen 70 corresponds to a unique login/authentication session, which, as is known in the art, may include performing an authenticated handshake protocol between the service provider and the client computer. In some embodiments, the login screen need not include a password field, since the user's identity is verified through authentication server 60 and mobile communication device 30 as described above. In some embodiments, the login screen may include a password field, and the remote/backend authentication described above may be performed in conjunction with a conventional password-based authentication performed directly by service provider server 22.

Figure 7:
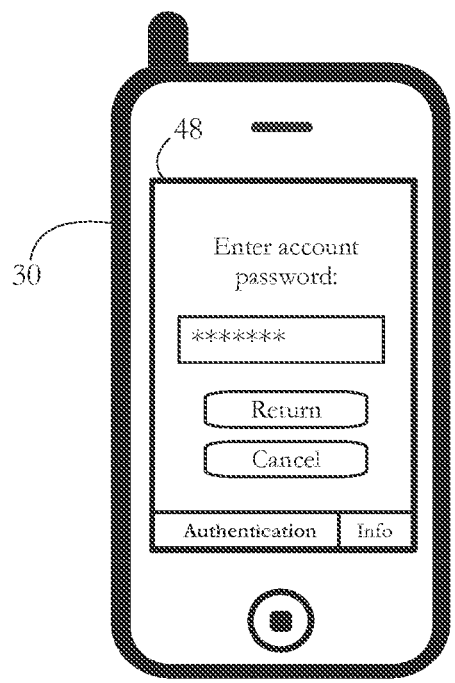
FIG. 7 shows a login screen displayed on a mobile communication device, according to some embodiments of the present invention.

FIG. 7 shows an exemplary login screen 48 displayed on mobile communication device 30 in order to allow access to the user's private key stored on mobile communication device 30. Login screen 48 includes a password entry field for receiving the password user input from the user. Login screen 48 is generated by an authentication App running on mobile communication device 30, which is used to obtain the pending ticket for the user's identity from authentication server 60. Mobile communication device 30 may communicate with authentication server 60 using a secure connection such as a connection using a TLS (Transport Layer Security) or SSL (Secure Sockets Layer) protocol, which may use a challenge-response mechanism for authentication. To prove that the user is the owner of the identity, mobile communication device 30 authenticates itself using the private key of the identity. To use the private key, the user enters his/her password into the mobile communication as shown in FIG. 7. The App decrypts the private key with the entered password.

FIG. 8-A shows a pair of matching Ticket ID representations 50, 50' displayed by client computer system 20 and mobile communication device 30 within Ticket ID display screens 78, 78', respectively. Display screens 78, 78' include a description of the service provider (e.g. domain name). Mobile device display screen 78' also includes a timestamp associated with the Ticket ID, as well as user input fields for accepting or rejecting the Ticket ID. The Ticket ID shown in FIG. 8-A comprises an alphanumeric set or ordered list (e.g. string, array, or integer) of characters and/or numbers, PCTJX in the illustrated example, the set being uniquely associated to the respective session-specific authentication request. The two representations may differ in formatting—e.g. font, size, display color, screen resolution, etc. More generally, the Ticket ID may include other identifiers suitable for identifying a login session. Such ticket IDs may be chosen to be long/specific enough to prevent the collision of identical ticket IDs generated for different login sessions. In some embodiments, such ticket IDs may be generated at the authentication server 60 e.g. by hashing or other methods, for example random generators which make a Ticket ID unpredictable for a potential attacker. Service provider 22 then presents a representation of the Ticket ID to the user on client computer system 20.

Authentication server 60 returns the pending ticket including the respective Ticket ID (or a different but matching Ticket ID) to the authentication App on the mobile communication device 30. In some embodiments, the Ticket IDs provided by authentication server 60 to service provider server 22 and mobile communication device 30 are identical. In some embodiments, the two ticket IDs are distinct, but form a matching pair that can be used by the service provider and mobile communication device to generate matching ticket ID sensory representations, as shown below in FIG. 8-C.

The user verifies that the Ticket ID representation 50' displayed by mobile communication device 30 matches the Ticket ID representation 50 displayed on client computer system 20. The user then accepts or denies the pending ticket using the user interface of mobile communication device 30. The user can accept the ticket if the two ticket ID representations match. If the two representations do not match, the user can avoid accepting a ticket that does not match the session he/she would like to authenticate. The representations may not match if for example someone other than the user has attempted a login, or if the user has made a second login attempt after a disconnection or other event interrupted a first login attempt. In some embodiments, the two representations match if they are identical in substance/content (i.e. are defined by identical alphanumeric sequences), as shown for example in FIG. 8-A. The two representations may differ in formatting—e.g. font, size, display color, screen resolution, etc.

In some embodiments, if the ticket has been accepted by the user on mobile communication device 30, authentication server 60 pushes an acceptance notification to service provider server 22, which in response authenticates the user's corresponding login session on the service provider server 22, and grants the user access to the desired protected service/resources. The access may be granted without requiring any user confirmation/input on the client computer system 20 for example by using appropriate Javascript code on the login website. In some embodiments, the user may be asked to confirm the completion of identity authentication on the web portal and/or to click to proceed with the login on client computer system 20 after authentication is completed. The communication of the acceptance notification may also be implemented using a pull model, by sending first a request from the service provider server 22, and receiving an acceptance notification in response from the authentication server 60.

In some embodiments, only one ticket can be pending for a given identity. If authentication by authentication server 60 is requested while a ticket is already pending for that identity, the existing ticket is retracted and no new ticket is issued, in order to make it more difficult for an attacker to replace a pending ticket with his/her own ticket.

In some embodiments, if a ticket is retracted due to multiple authentication requests, the identity (account) is marked as vulnerable by the authentication server system. An identity may also be marked as vulnerable if some predetermined number, which may be higher than one, of retractions or uncompleted authentication attempts are detected by the authentication server. If another authentication request is made for a vulnerable identity, the ticket ID will not be returned to mobile device 30. Instead, the user must enter the ticket ID manually as displayed by the App. Requiring manual entry addresses a situation in which a user accidentally accepts a ticket generated by an authentication request of an attacker (See also "Reliable Authentication" below).

FIG. 8-B shows an exemplary mobile device Ticket ID screen 78" including multiple similarly-formatted co-displayed representations of potential Ticket IDs, only one of which is a valid Ticket ID representation 50. The various representations may include the same number of characters/numbers in identical or similar fonts. A user chooses the correct TicketID from among the available choices. Forcing users to choose the correct Ticket ID from among multiple choices as shown in FIG. 8-B reduces the likelihood of users' inadvertent selection of non-matching Ticket IDs. Such inadvertent selections can become particularly pronounced as users get accustomed to the authentication process, and select Ticket ID representations semi-automatically, without reviewing carefully the match between the two members of the Ticket ID display pair.

In some embodiments, a Tticket ID representation may include other types of graphical and/or other sensory representations that can be recognized by a user as matching each other and identifying a login session. FIG. 8-C shows a number of such representations of matching pairs. Exemplary graphical representations may include combinations of numbers, letter, other symbols, and/or pictures (e.g. colored surfaces/patterns). Matching may be established by similarity or complementarity of shapes, colors, hatching or other texture patterns, or other graphical features. Exemplary auditory representations may include speech, music, and/or sound/beep sequences. Exemplary tactile representations may include vibration sequences/patterns. In other examples, one representation may be a graphical representation of a word or alphanumeric sequence while the other is a spoken/auditory representation of the word/alphanumeric sequence, or one representation may be a Morse code sequence display while the other may be a matching vibration sequence played by the mobile communication device. In some embodiments, the two representations match if they are complementary, so that a user can recognize the two representations as forming a pair. In one example, one representation may be a picture that would be recognized as complementary to another—e.g. two geometric patterns having a mutually matching irregular boundary pattern, or geometric or other graphic patterns having complementary colors or shapes, or the cartoon characters Tom and Jerry, if users recognize Tom as a match for Jerry. Suitable ticket ID representations may include pairs of representations, in whatever form, that a human user can verify/confirm as matching each other.

Challenge-Response Exchange

Figure 9:
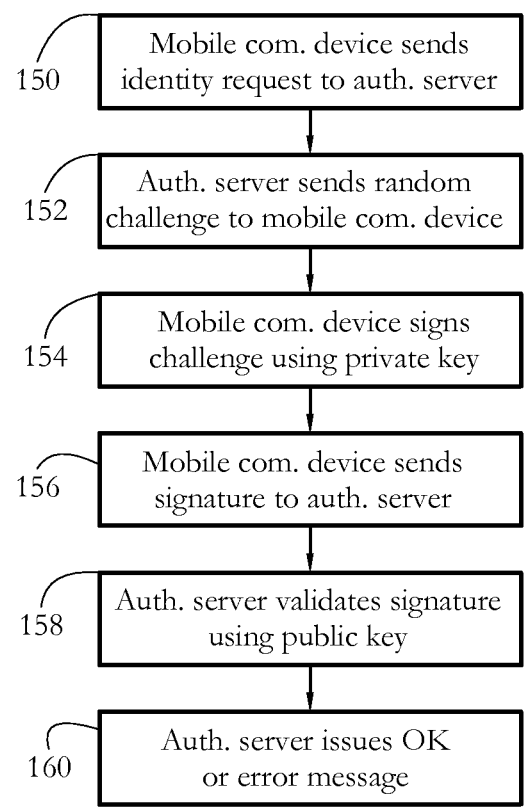
FIG. 9 illustrates a challenge-response sequence of steps according to some embodiments of the present invention.

When accessing an identity on authentication server 60, mobile communication device 30 may be required to prove that it is the owner of the respective identity. This may be done via a challenge-response exchange or other methods known in the art. An exemplary set of steps performing challenge-response is illustrated in FIG. 9. In a step 150, mobile communication device 30 sends a request to authentication server 60 for a given identity. Authentication server 60 generates a random challenge and returns it to mobile communication device 30, requesting authentication (step 152). Mobile communication device 30 signs the challenge with the locally-stored key associated with the identity (step 154), and sends the signed challenge to authentication server 60 (step 156). In a step 158, authentication server 60 validates the signature using the public key for the given identity. In a step 160, authentication server 60 continues serving the request if the signature is validated, or returns an error if the validation fails.

Reliable Authentication

In some embodiments, if another ticket is requested while a ticket is already pending, authentication server 60 retracts the existing ticket, but issues no new ticket, since such an occurrence could be an indication of an attack. However, the user can now request a new ticket. In such a case of a possible attack, authentication server 60 tags an identity as vulnerable. In some embodiments, the user then does not get the Ticket ID displayed but must enter it manually on mobile communication device 30, after mobile communication device displays the timestamp of issue and a description (e.g. name) of the service to the user, and the user verifies that the timestamp and service description make sense. The user manually copies the Ticket ID characters from the display of client computer system 30 to the mobile communication device 30, and decides whether to accept or deny the requested access to the ticket. Requiring such manual entry reduces the chance that a user accidentally accepts a different ticket than that displayed by the service provider and/or authentication App.

Registration

Figure 10:
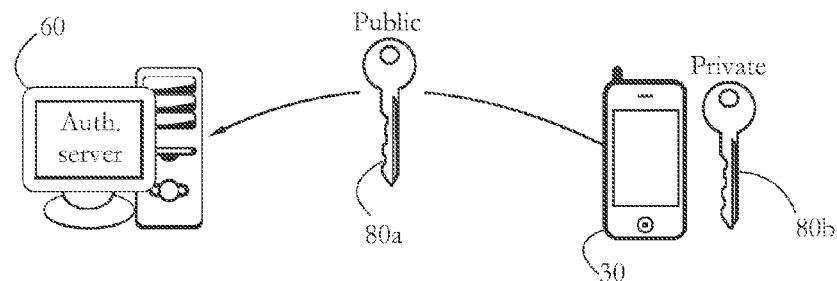
FIG. 10 illustrates a public key exchange between an authentication server and a mobile communication device according to some embodiments of the present invention.

In some embodiments, before any identity authentication can proceed, mobile communication device 30 registers itself at authentication server 60. Mobile communication device 30 creates a cryptographic key pair, shown in FIG. 10 at 80*a*-*b*, and transmits a public key 80*a* to authentication server 60, while storing a corresponding private key 80*b* locally on mobile communication device 30. Some embodiments may employ a 1024-bit RSA (Rivest, Shamir and Adleman) key pair. The length of the keys can be increased at any time, to increase security. In some embodiments, private key 80*b*, which is stored on mobile communication device 30, is 256-bit AES (Advanced Encryption Standard) encrypted using a user-defined password. Such encryption avoids illegitimate use of an identity by third parties. The user has to enter the password to decrypt private key 80*b* before it can be used, as shown in FIG. 7. Since only the respective user knows the correct password and since the password is not stored on the mobile communication device, the private key cannot be readily compromised. In some embodiments, mobile communication device 30 only transmits public key 80*a*, which can be used to verify the identity of the respective user. Only private key 80*b* can be used to prove the identity. Since private key 80*b* is never transmitted anywhere, it cannot be intercepted or compromised on authentication the server side.

Figure 11:
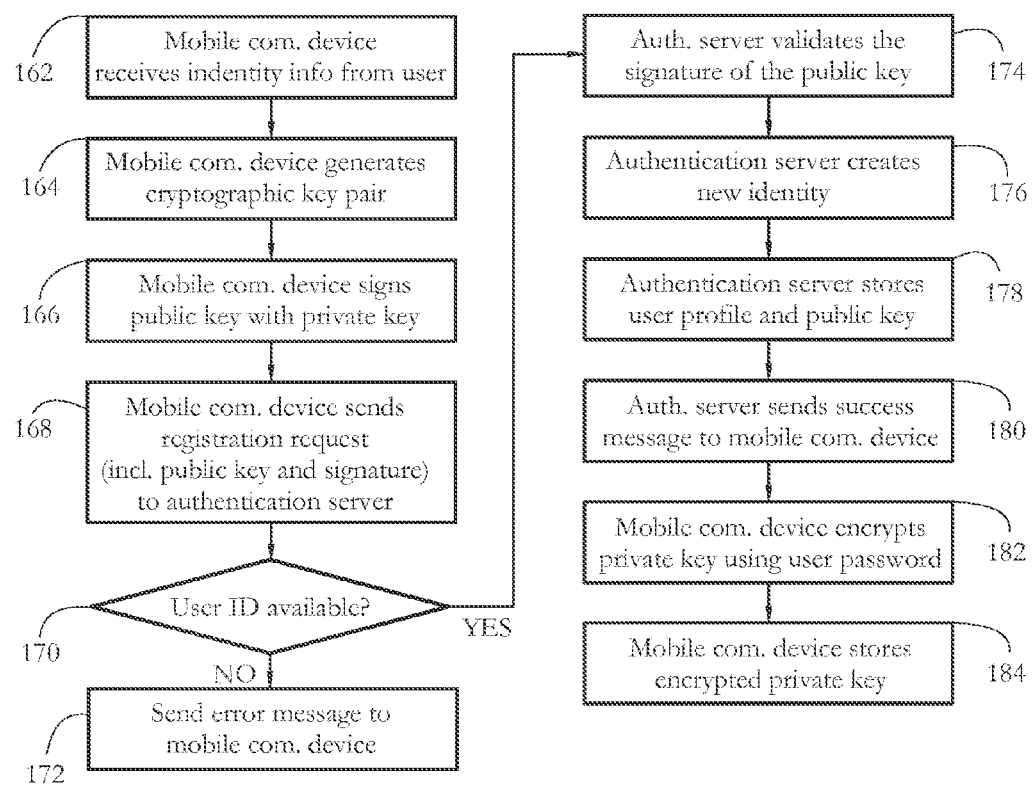
FIG. 11 shows a sequence of steps performed in a registration procedure according to some embodiments of the present invention.

An exemplary sequence of steps carrying out a registration procedure is illustrated in FIG. 11. In a step 162, mobile communication device 30 receives identity and other setup information from a user. Such information may include a human-readable name for personal use, a user ID, password, and host address and port. Other such information may include a title and email address. Mobile communication device 30 generates a cryptographic key pair including a private key and a public key (step 164), and signs the public key with the private key (step 166). In a step 168, mobile communication device 30 sends a registration request to authentication server 60. The registration request may include a desired user ID, the public key, the signed public key, and the associated personal data entered by the user. Authentication server 60 checks whether the requested user ID is available (step 170), and returns an error message to mobile communication device 30 if the user ID is not available (step 172). If the user ID is available, authentication server 60 validates the signature of the public key, verifying that the sender of the registration request owns the corresponding private key (step 174). Authentication server 60 creates a new identity for the selected user ID (step 176), stores the public key and user profile associated with the user ID (step 178), and sends a success message to mobile communication device 30 (step 180). In a step 182, mobile communication device 30 encrypts the private key using the user password. Mobile communication device 30 then stores the encrypted private key and user profile (step 184).

Identity Editing

In some embodiments, the user can edit at any time the identity information stored on mobile communication device 30 (e.g. user name, server address and -port), as well as the identity information stored on authentication server 60 (e.g. contact details, account preferences), and the password corresponding to the respective identity. All changes are carried out only after the user authenticates himself/herself by entering the password. When the user requests a change of password, the private key is decrypted with the old password and encrypted again with the new password.

Figure 12:
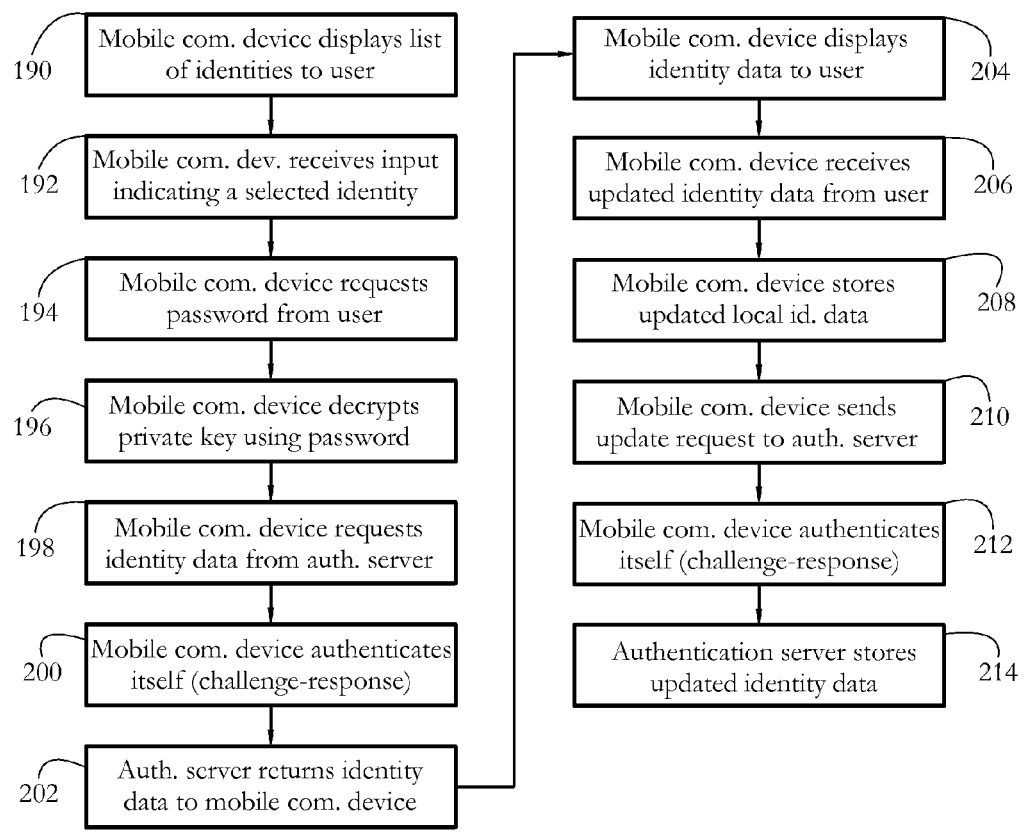
FIG. 12 shows a sequence of steps performed to edit an identity according to some embodiments of the present invention.

An exemplary sequence of steps for editing an identity is shown in FIG. 12. In a step 190, mobile communication device 30 displays a list of identities to the user. In a step 192, mobile communication device 30 receives user input indicating a selected identity. For example, the user may switch the identity list to edit mode, and tap a selected identity to edit. In a step 194, mobile communication device 30 asks the user for the password for the selected identity. In response to the user's entry of the correct password, mobile communication device 30 decrypts the private key for the selected identity using the entered password (step 196). In a step 198, mobile communication device 30 requests the personal information associated with the selected identity from authentication server 60. In a step 200, mobile communication device 30 authenticates itself to authentication server 60 using challenge-response authentication using the decrypted private key, as described above. In a step 202, authentication server 60 returns the requested personal information of the identity to mobile communication device 30.

In a step 204, mobile communication device 30 displays the personal information to the user for editing. Mobile communication device 30 receives updated personal information from the user (step 206), and saves the local information to local storage (e.g. disk) (step 208). Mobile communication device 30 then sends an update request asking authentication server 60 to save the personal information (step 210), and authenticates itself to authentication server 60 via challenge-response authentication (step 212). In response, authentication server 60 stores the updated personal information for the identity (step 214). Mobile communication device 30 then switches its display back to the identity list.

Key Renewal

It is possible to create a new key pair and to transmit the new public key to authentication server 60, to replace the old public key. In some embodiments, the key renewal option is available from within the authentication application running on mobile communication device 30, so the password for the old keypair has already been entered and the old key has already been decrypted.

Figure 13:
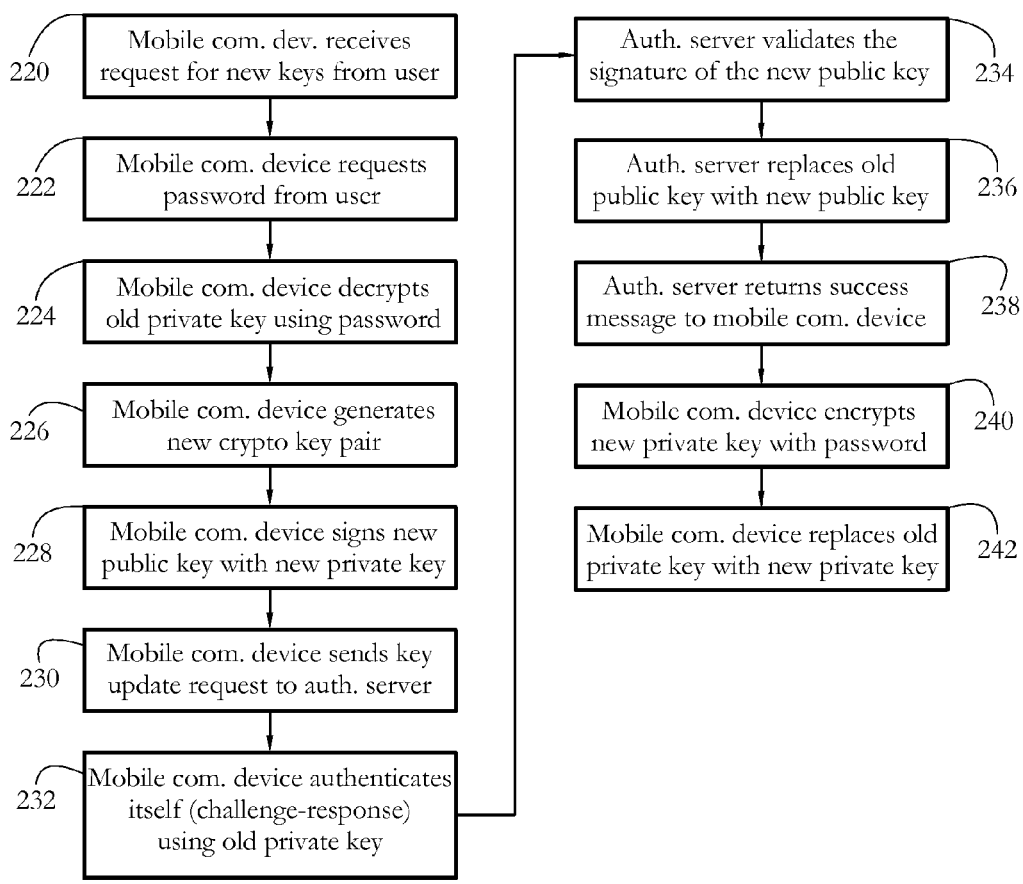
FIG. 13 shows a sequence of steps performed to renew a key pair according to some embodiments of the present invention.

An exemplary sequence of steps for renewing a keypair is illustrated in FIG. 13. In a step 220, mobile communication device 30 receives a request for new keys from a user. Mobile communication device 30 requests the password for the selected identity from the user (step 222), decrypts the existing (old) private key using the entered password (step 224), generates a new cryptographic key pair (step 226), signs the new public key with the new private key (step 228), and sends a key update request to authentication server 60 (step 230). The key update request may include the user ID, new public key, and the signed new public key. In a step 232, mobile communication device 30 authenticates itself via challenge-response authentication using the existing (old) private key.

In response, authentication server 60 validates the signature of the new public key, verifying that the sender of the request owns the corresponding private key (step 234), replaces the existing (old) public key with the new public key in its records (step 236), and returns a success code to mobile communication device 30. Mobile communication device 30 encrypts the new private key with the corresponding password (step 240), and replaces the existing (old) private key with the new private key in its local storage (step 242).

CONCLUSION

The exemplary systems and methods described above provide ways of addressing inherent tradeoffs between authentication system usability and security. Once a user has established his identity and authenticated his mobile communication device, logins on service provider systems may be performed with minimal user input, e.g. without requiring entering a password on the service provider sites. At the same time, in such a system, two distinct but related issues appear: on the one hand, unauthorized users are capable of entering a user ID on a web portal, particularly around the same time that an authorized user is attempting a login, and on the other, an authorized user may wish, because of disconnections or other events, to start a new login session before a previous login session on the same service provider system completed successfully.

The exemplary ticket ID systems and methods described above reduce the vulnerability of the systems to attack without requiring user entry of a code or other information on the service provider system or mobile communication device. Since user IDs are generally not secure information, an attacker or other unauthorized third party may initiate a login session on a service provider's system, and then wait for authentication. In the absence of a ticket ID display, a user would have an increased chance of confirming/authenticating an undesired login session. Attackers may even automate such an attack method for multiple user IDs, in the hope that at least some user IDs will respond. Making sure that a single ticket ID can be pending at a given time for a given user identity would reduce the chances of success of such an attack, but can also make legitimate logins by the user more difficult in the case of attacks or problems encountered during a prior legitimate login session. A legitimate login session may be interrupted by a disconnection before completion of the authentication process completes. Such disconnections may occur in less robust communication environments, for example for traveling users.

It will be clear to one skilled in the art that the above embodiments may be altered in many ways without departing from the scope of the invention.

What is claimed is:

1. An authentication server computer system comprising at least one processor configured to:
    communicate with a mobile communication device of a user to authenticate the mobile communication device as authorized to validate a user login session by a user client computer system on a service provider server;
    send to the mobile communication device a request for user validation of the user login session on the service provider server;
    in response to sending to the mobile communication device the request for user validation of the user login session, receive from the mobile communication device a user acceptance of the request for user validation of the user login session, wherein the user acceptance indicates a user confirmation that a first sensory identification of the login session presented to the user on the mobile communication device matches a second sensory identification of the login session presented to the user on the user client computer system; and in response to authenticating the mobile communication device and receiving the user acceptance, send to the service provider an indicator of the user's acceptance, for allowing the user client computer system access to a restricted resource on the service provider server.

2. The authentication server computer system of claim 1, wherein the authentication server computer system is configured to generate and send to the mobile communication device an identifier of the user login session, the mobile communication device generating the first sensory identification of the login session according to the identifier of the user login session.

3. The authentication server computer system of claim 2, wherein the authentication server computer system is configured to send to the service provider the identifier of the user login session, the service provider server generating the second sensory identification of the login session according to the identifier of the user login session.

4. The authentication server computer system of claim 1, wherein the first sensory identification of the login session comprises a first display of an alphanumeric sequence.

5. The authentication server computer system of claim 4, wherein the second sensory identification of the login session comprises a second display of the alphanumeric sequence.

6. The authentication server computer system of claim 1, wherein the first sensory identification of the login session comprises a first graphical display, and the second sensory identification of the login session comprises a second graphical display.

7. The authentication server computer system of claim 6, wherein the first graphical display is identical in content to the second graphical display.

8. The authentication server computer system of claim 6, wherein the first graphical display is complementary to the second graphical display.

9. The authentication server computer system of claim 1, wherein the first sensory identification of the login session is a graphical representation, and wherein the second sensory identification of the login session is a non-graphical representation.

10. The authentication server computer system of claim 1, wherein the user acceptance indicates a user selection of the first sensory identification of the login session from among a plurality of comparable sensory presentations presented to the user on the mobile communication device.

11. The authentication server computer system of claim 1, wherein the authentication server computer system is configured to revoke the request to validate the login session sent to the mobile communication device in response to receiving, before receiving the user acceptance, a request to validate an additional login session of the user.

12. A mobile communication device comprising at least one processor configured to:
communicate with an authentication server computer system to authenticate the mobile communication device as authorized to validate a user login session by a user client computer system on a service provider server;
receive from the authentication server computer system a request for user validation of the user login session on the service provider server;
in response to receiving the request for user validation of the user login session, present to the user a first sensory identification of the login session, wherein the first sensory identification matches a second sensory identification of the login session presented to the user on the user client computer system;
receive from the user a user acceptance of the request for user validation of the user login session, wherein the user acceptance indicates a user confirmation that the first sensory identification matches the second sensory identification; and
in response to receiving the user acceptance, send to the authentication server computer system an indicator of the user acceptance, for allowing the user client computer system access to a restricted resource on the service provider server.

13. The mobile communication device of claim 12, wherein the mobile communication device is configured to generate and send to the service provider server an identifier of the user login session, the service provider server generating the second sensory identification of the login session according to the identifier of the user login session.

14. The mobile communication device of claim 12, wherein the first sensory identification of the login session comprises a first display of an alphanumeric sequence.

15. The mobile communication device of claim 14, wherein the second sensory identification of the login session comprises a second display of the alphanumeric sequence.

16. The mobile communication device of claim 12, wherein the first sensory identification of the login session comprises a first graphical display, and the second sensory identification of the login session comprises a second graphical display.

17. The mobile communication device of claim 16, wherein the first graphical display is identical in content to the second graphical display.

18. The mobile communication device of claim 16, wherein the first graphical display is complementary to the second graphical display.

19. The mobile communication device of claim 12, wherein the first sensory identification of the login session is a graphical representation, and wherein the second sensory identification of the login session is a non-graphical representation.

20. The mobile communication device of claim 12, wherein the user acceptance indicates a user selection of the first sensory identification of the login session from among a plurality of comparable sensory presentations presented to the user on the mobile communication device.

21. A service provider computer system comprising at least one processor configured to:
receive from a user client computer system a request to initiate a user login session for a user;
generate and send to the user client computer system a first sensory identification of the login session to be presented to the user by the user client computer system;
send to an authentication server computer system a request for user validation of the user login session;
receive from the authentication server computer system an indicator of the user's acceptance of the request for user validation, wherein receiving the indicator of the user's acceptance indicates:
an authentication by the authentication server computer system of a mobile communication device of the user as authorized to validate the user login session, and
a user confirmation that a second sensory identification of the login session presented to the user on the mobile communication device matches the first sensory identification of the login session presented to the user by the user client computer system; and in response to receiving from the authentication server computer system the indicator of the user's acceptance of the request for user validation, allowing the user client computer system access to a restricted resource on the service provider server.

22. The service provider computer system of claim 21, wherein the service provider computer system is configured to generate and send to the mobile communication device an identifier of the user login session, the mobile communication device generating the second sensory identification of the login session according to the identifier of the user login session.

23. The service provider computer system of claim 21, wherein the service provider computer system is configured to send the identifier of the user login session to the mobile communication device through the authentication server computer system.

24. The service provider computer system of claim 21, wherein the first sensory identification of the login session comprises a first display of an alphanumeric sequence.

25. The service provider computer system of claim 24, wherein the second sensory identification of the login session comprises a second display of the alphanumeric sequence.

26. The service provider computer system of claim 21, wherein the first sensory identification of the login session comprises a first graphical display, and the second sensory identification of the login session comprises a second graphical display.

27. The service provider computer system of claim 26, wherein the first graphical display is identical in content to the second graphical display.

28. The service provider computer system of claim 26, wherein the first graphical display is complementary to the second graphical display.

29. The service provider computer system of claim 21, wherein the first sensory identification of the login session is a graphical representation, and wherein the second sensory identification of the login session is a non-graphical representation.

30. The service provider computer system of claim 21, wherein the user acceptance indicates a user selection of the second sensory identification of the login session from among a plurality of comparable sensory presentations presented to the user on the mobile communication device.

* * * * *